US009946106B2

(12) United States Patent
Braganza et al.

(10) Patent No.: US 9,946,106 B2
(45) Date of Patent: Apr. 17, 2018

(54) ELECTRONIC DISPLAY WITH SEMITRANSPARENT BACK LAYER

(71) Applicant: Kent Displays Incorporated, Kent, OH (US)

(72) Inventors: Clinton Braganza, Kent, OH (US); Matthew Schlemmer, Kent, OH (US); Erica Montbach, Kent, OH (US); Asad Khan, Kent, OH (US)

(73) Assignee: Kent Displays Inc., Kent, OH (US)

( * ) Notice: Subject to any disclaimer, the term of this patent is extended or adjusted under 35 U.S.C. 154(b) by 446 days.

(21) Appl. No.: 14/678,482

(22) Filed: Apr. 3, 2015

(65) Prior Publication Data

US 2016/0091745 A1 Mar. 31, 2016

Related U.S. Application Data

(62) Division of application No. 13/477,638, filed on May 22, 2012, now Pat. No. 9,116,379.

(51) Int. Cl.
*G02F 1/1335* (2006.01)
*G02F 1/1333* (2006.01)
(Continued)

(52) U.S. Cl.
CPC .......... *G02F 1/13338* (2013.01); *B43L 1/004* (2013.01); *B43L 1/12* (2013.01); *B43L 1/123* (2013.01); *G02F 1/13718* (2013.01); *G02F 1/133553* (2013.01); *G02F 1/133514* (2013.01); *G02F 1/133555* (2013.01); *G02F 2001/133374* (2013.01)

(58) Field of Classification Search
CPC .................................................. G02F 1/13338
See application file for complete search history.

(56) References Cited

U.S. PATENT DOCUMENTS 4,525,032 A 6/1985 Hilsum
4,685,771 A 8/1987 West et al.
(Continued)

FOREIGN PATENT DOCUMENTS

CN 1460199 A 12/2003
CN 1497301 A 5/2004
(Continued)

OTHER PUBLICATIONS

Dry Erase Presentation Boards, Retrieved from http://speakeasydryerase.com/files/specifications/selfadhesivespec.pdf Feb. 19, 2009.
(Continued)

*Primary Examiner* — Wen-Ying P Chen
(74) *Attorney, Agent, or Firm* — Abel Law Group, LLP

(57) ABSTRACT

An electronic display includes electrically conductive layers. An active layer is disposed between adjacent electrically conductive layers. The active layer includes cholesteric liquid crystal material. At least one transparent front substrate is disposed adjacent one of the electrically conductive layers near a front of the display. A semitransparent back layer absorbs light that passes through the active layer, reflects grey light or light of a color and is light transmitting. Electronic circuitry applies a voltage to the conductive layers that enables at least one of erasing or writing of the active layer.

28 Claims, 15 Drawing Sheets

(51) Int. Cl.
  *G02F 1/137* (2006.01)
  *B43L 1/00* (2006.01)
  *B43L 1/12* (2006.01)

(56) References Cited

U.S. PATENT DOCUMENTS

| | | | |
|---|---|---|---|
| 5,347,811 | A | 9/1994 | Hasegawa et al. |
| 5,453,863 | A | 9/1995 | West et al. |
| 5,493,430 | A | 2/1996 | Lu et al. |
| 5,594,562 | A | 1/1997 | Sato et al. |
| 5,644,330 | A | 7/1997 | Catchpole et al. |
| 5,691,795 | A | 11/1997 | Doane et al. |
| 5,748,277 | A | 5/1998 | Huang et al. |
| 5,847,798 | A | 12/1998 | Yang et al. |
| 5,933,203 | A | 8/1999 | Wu et al. |
| 6,104,448 | A | 8/2000 | Doane et al. |
| 6,133,895 | A | 10/2000 | Huang |
| 6,154,190 | A | 11/2000 | Yang et al. |
| 6,268,839 | B1 | 7/2001 | Yang et al. |
| 6,359,673 | B1 | 3/2002 | Stephenson |
| 6,377,321 | B1 | 4/2002 | Khan et al. |
| 6,473,072 | B1 | 10/2002 | Comiskey et al. |
| 6,618,102 | B2 | 9/2003 | Harada et al. |
| 6,639,578 | B1 | 10/2003 | Comiskey et al. |
| 6,654,080 | B1 | 11/2003 | Khan et al. |
| 6,697,039 | B1 | 2/2004 | Yamakawa et al. |
| 6,727,873 | B2 | 4/2004 | Gordon, II et al. |
| 6,730,862 | B1 | 5/2004 | Gasparik |
| 6,752,430 | B2 | 6/2004 | Holt et al. |
| 6,753,933 | B2 | 6/2004 | Cirkel et al. |
| 6,759,399 | B1 | 7/2004 | Petit et al. |
| 6,788,362 | B2 | 9/2004 | Stephenson et al. |
| 6,788,363 | B2 | 9/2004 | Liu et al. |
| 6,811,815 | B2 | 11/2004 | He et al. |
| 6,816,138 | B2 | 11/2004 | Huang et al. |
| 6,825,829 | B1 | 11/2004 | Albert et al. |
| 6,833,885 | B2 | 12/2004 | Hisamitsu et al. |
| 6,842,210 | B2 | 1/2005 | Hashimoto et al. |
| 6,885,409 | B2 | 4/2005 | Stephenson et al. |
| 6,894,733 | B2 | 5/2005 | Izumi et al. |
| 6,934,792 | B1 | 8/2005 | Nakazawa |
| 6,999,061 | B2 | 2/2006 | Hara et al. |
| 7,061,559 | B2 | 6/2006 | Khan et al. |
| 7,075,593 | B2 | 7/2006 | Vidal et al. |
| 7,132,064 | B2 | 11/2006 | Li et al. |
| 7,136,048 | B2 | 11/2006 | Yrjanainen et al. |
| 7,170,481 | B2 | 1/2007 | Doane et al. |
| 7,188,996 | B2 | 3/2007 | Parker |
| 7,190,337 | B2 | 3/2007 | Miller, IV et al. |
| 7,236,151 | B2 | 6/2007 | Doane et al. |
| 7,242,394 | B2 | 7/2007 | Lahade et al. |
| 7,245,483 | B2 | 7/2007 | Feague et al. |
| 7,317,437 | B2 | 1/2008 | Huang et al. |
| 7,351,506 | B2 | 4/2008 | Schneider et al. |
| 7,385,656 | B2 | 6/2008 | Nose et al. |
| 7,479,940 | B2 | 1/2009 | Marhefka |
| 7,746,430 | B2 | 6/2010 | Kurosaki et al. |
| 8,139,039 | B2 | 3/2012 | Schneider et al. |
| 8,199,086 | B2 | 6/2012 | Doane |
| 8,228,301 | B2 | 7/2012 | Schneider |
| 8,310,630 | B2 | 11/2012 | Marhefka et al. |
| 2002/0022113 | A1 | 2/2002 | Kimura |
| 2003/0043317 | A1 | 3/2003 | Cirkel et al. |
| 2003/0058227 | A1 | 3/2003 | Hara et al. |
| 2003/0071754 | A1 | 4/2003 | McEwan |
| 2003/0071958 | A1 | 4/2003 | Wu et al. |
| 2003/0137496 | A1 | 7/2003 | Stevens et al. |
| 2003/0156099 | A1 | 8/2003 | Yrjanainen et al. |
| 2003/0156243 | A1 | 8/2003 | Yoshihara et al. |
| 2003/0160741 | A1 | 8/2003 | Martinez |
| 2004/0066374 | A1 | 4/2004 | Holloway et al. |
| 2004/0140964 | A1 | 7/2004 | Wang et al. |
| 2004/0145691 | A1 | 7/2004 | Kubota et al. |
| 2004/0159702 | A1 | 8/2004 | Rosenfeld |
| 2004/0207606 | A1 | 10/2004 | Atwood et al. |
| 2004/0263486 | A1 | 12/2004 | Seni |
| 2005/0079386 | A1 | 4/2005 | Brown, Jr. et al. |
| 2005/0104806 | A1 | 5/2005 | Stephenson, III |
| 2006/0017708 | A1 | 1/2006 | Fukui et al. |
| 2006/0151601 | A1 | 7/2006 | Rosenfeld |
| 2006/0204675 | A1 | 9/2006 | Gao et al. |
| 2006/0262235 | A1 | 11/2006 | Vogels et al. |
| 2006/0267955 | A1 | 11/2006 | Hino |
| 2007/0026163 | A1 | 2/2007 | Schneider et al. |
| 2007/0059901 | A1 | 3/2007 | Majumdar et al. |
| 2007/0063939 | A1 | 3/2007 | Bellamy |
| 2007/0085837 | A1 | 4/2007 | Ricks et al. |
| 2007/0126674 | A1 | 6/2007 | Doane |
| 2007/0152928 | A1 | 7/2007 | Doane et al. |
| 2007/0164980 | A1 | 7/2007 | Manning |
| 2007/0237906 | A1 | 10/2007 | Li et al. |
| 2007/0238080 | A1 | 10/2007 | Lynch |
| 2007/0277659 | A1 | 12/2007 | Schneider et al. |
| 2007/0285385 | A1 | 12/2007 | Albert et al. |
| 2008/0074383 | A1 | 3/2008 | Dean |
| 2008/0309598 | A1 | 12/2008 | Doane et al. |
| 2009/0033811 | A1 | 2/2009 | Schneider |
| 2009/0096942 | A1 | 4/2009 | Schneider et al. |
| 2009/0284691 | A1 | 11/2009 | Marhefka et al. |
| 2009/0297860 | A1 | 12/2009 | Sasaki et al. |
| 2010/0073614 | A1* | 3/2010 | Fujioka ............ G02F 1/133514 349/114 |
| 2010/0216635 | A1 | 8/2010 | Kazmaier et al. |
| 2010/0245221 | A1 | 9/2010 | Khan |
| 2011/0187650 | A1 | 8/2011 | Lee |
| 2011/0193874 | A1 | 8/2011 | Jung et al. |
| 2012/0099030 | A1 | 4/2012 | Pishnyak |
| 2013/0314622 | A1 | 11/2013 | Braganza et al. |
| 2014/0043547 | A1 | 2/2014 | Marhefka et al. |

FOREIGN PATENT DOCUMENTS

| | | |
|---|---|---|
| CN | 1851549 A | 10/2006 |
| JP | 05053537 | 3/1993 |
| JP | 08035759 | 2/1996 |
| JP | 2001125108 | 5/2001 |
| JP | 2001201762 A | 7/2001 |
| JP | 2001334693 | 12/2001 |
| JP | 2002163070 | 6/2002 |
| JP | 2004331697 | 11/2004 |
| JP | 2009237211 A | 10/2009 |
| WO | 2005081779 | 9/2005 |
| WO | 2009065563 | 5/2009 |

OTHER PUBLICATIONS

Etch a Sketch Animator 2000, Retrieved from http://en.wikipedia.org/wiki/Etch_A_Sketch Feb. 19, 2009.
How Magna Doodle Works, Retrieved from http://entertainment.howstuffworks.com/magna-doodle.htm Feb. 19, 2009.
Interactive Whiteboard, Retrieved from http://www.alibaba.com/product-gs/212710367/Interactive_Whiteboard.html Feb. 19, 2009.
Smartboard Polycom IVC, Retrieved from http://dl.austincc.edu/ivc/equipment/smartboardh323.htm.
Office action dated Jun. 24, 2011 from U.S. Appl. No. 11/762,174, filed Jun. 13, 2007.
Final Office action dated Jan. 19, 2012 from U.S. Appl. No. 11/762,174, filed Jun. 13, 2007.
Notice of Allowance dated Feb. 16, 2012 from U.S. Appl. No. 12/217,158, filed Jul. 1, 2008.
International Search Report for Application No. PCT/US2010/036175 dated Dec. 23, 2010.
Brochure of a Skin Flik™ electronic skin product published in the U.S. after May 22, 2011.
Description of a Skin Flik™ electronic skin product sold in the U.S. after May 22, 2011.
E. Montbach, et al., Flexible Electronic Skin Display, SID Symposium Digest of Technical Papers, 2009, vol. 40, p. 16.
T. Schneider, et al., Flexible Encapsulated Cholesteric LCDs by Polymerization Induced Phase Separation, SID International Symposium Digest of Technical Papers, 2005, vol. 36, p. 1568.

(56) References Cited

OTHER PUBLICATIONS

T. Schneider, et al., A Flexible Touch-Sensitive Writing Table, SID International Symposium Digest of Technical Papers, 2008, vol. 39, p. 1840.
U.S. Appl. No. 13/477,602, filed May 22, 2012, entitled Electronic Display With Patterned Layer, Inventor Erica N. Montbach, et al.
Office action dated Jul. 17, 2014 from U.S. Appl. No. 13/477,638, filed May 22, 2012.
U.S. Appl. No. 13/754,481 dated Jan. 30, 2013.
U.S. Appl. No. 13/927,647 dated Jun. 26, 2013.
U.S. Appl. No. 13/965,255 dated Aug. 13, 2013.
U.S. Appl. No. 13/975,692 dated Aug. 26, 2013.
U.S. Appl. No. 14/069,901 dated Nov. 1, 2013.
Amorphous Silicon Thin-Film Transistor Active-Matric Reflective Cholesteric Liquid Crystal Display: pp. 979-982 (1998).
Flexible Electronic Skin Display, SID Intl. Symp. Disgest Tech., 40 16 (2009) by E. Montbach et al.
J.William Doane and Asad Khan, Cholesteric Liquid Crystals for Flexible Displays, Flexible Flat Panel Displays, 331-354, 2005, John Wiley & Sons, Ltd.
Office Action dated Jul. 17, 2014 for U.S. Appl. No. 13/477,602.
Office Action dated Oct. 15, 2012 for U.S. Appl. No. 12/729,678.
Final Rejection dated Jun. 5, 2013 for U.S. Appl. No. 12/729,678.

\* cited by examiner

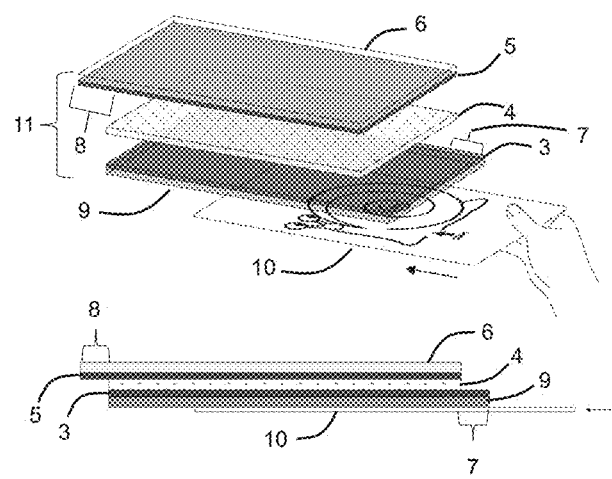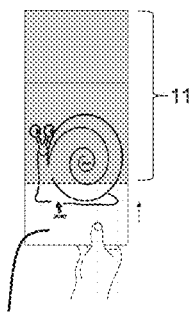
FIG. 2A
FIG. 2B
FIG. 2C

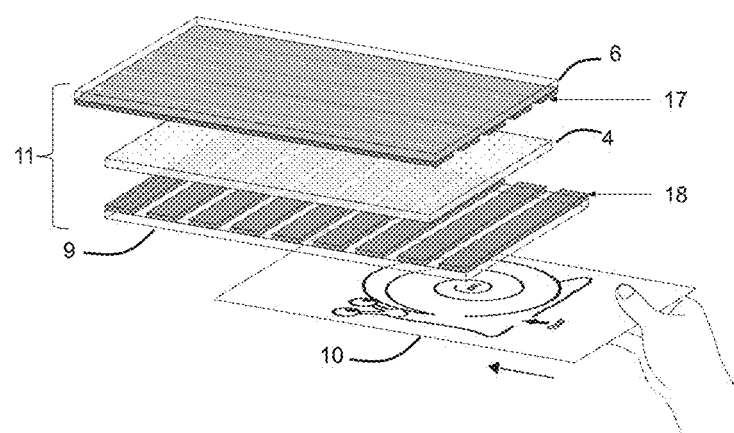

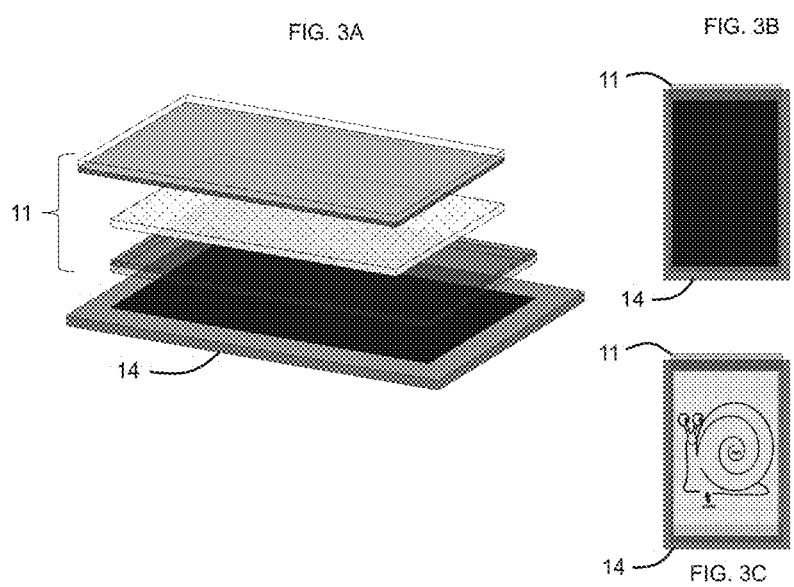

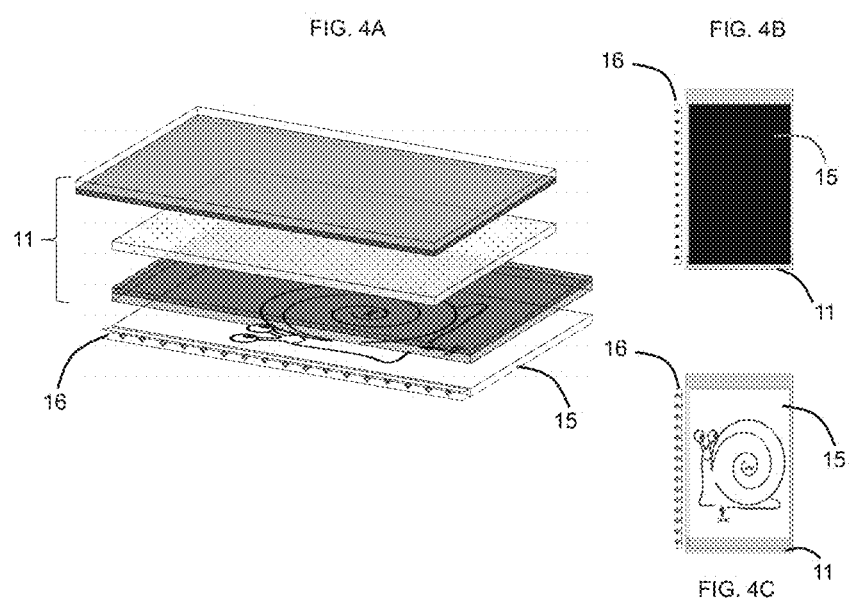

ELECTRONIC DISPLAY WITH SEMITRANSPARENT BACK LAYER

BACKGROUND OF THE INVENTION

This disclosure relates generally to an electronic display, for example, a writing/drawing tablet utilizing a pressure sensitive display. In general, Bistable Liquid Crystal Displays (BLCDs), and in particular, Cholesteric Liquid Crystal Displays (ChLCDs), have proven to have great potential to create low cost pressure sensitive displays that are efficient power consumers and that can be utilized in a number of unique devices.

Recently, the Boogie Board® pressure sensitive cholesteric liquid crystal writing tablet, of Improv® Electronics has appeared on the market in which a pointed stylus or the finger can be used to write or trace an image on the surface of the tablet as described in U.S. Pat. No. 6,104,448. This tablet offers a considerable improvement over previous tablet technologies in that the image can be simply and instantly erased with the push of a button that applies a voltage pulse to electrodes in the tablet. In a cholesteric liquid crystal writing tablet, the liquid crystal is sandwiched between two substrates that are spaced to a particular gap. The upper substrate is flexible and the bottom substrate is painted with a fixed opaque light absorbing dark background. Within the gap is a bistable cholesteric liquid crystal which can exhibit two textures, an essentially transparent (focal conic) texture and a color reflective (planar) texture. The spacing of the cell gap is usually set by plastic or glass spacers that are either cylindrical or spherical in shape. The tablet is initialized by applying voltage pulses to the electrodes to electrically drive the cholesteric material to the focal conic state. When one presses on the top substrate with a point stylus or finger, the liquid crystal is locally displaced. Flow induced in the liquid crystal changes its optical texture from essentially transparent to a brilliant reflective color at the location of the stylus. The reflective color contrasts well with the dark background of the lower substrate. An image traced by the stylus or finger will remain on the tablet indefinitely without application of a voltage until erased. Erasure is accomplished by applying a voltage pulse to transparent conducting electrodes on the inner surface of the substrates that drive the cholesteric liquid crystal from its color reflective state back to its essentially transparent state.

The above described principle is disclosed in more detail in U.S. Pat. No. 6,104,448. Polymer dispersions can be used to control the pressure sensitivity and resolution of the image as described in U.S. Patent Application Publication No. 2009/0033811, which is incorporated herein by reference. Other modes of operation and a tablet for multiple color images are described in this patent application publication and a means for select erase is disclosed in U.S. Patent Application Publication No. 2009/0096942, which is incorporated herein by reference and is applicable to the displays of the present disclosure. One mode of operation different from that described above is one in which the tablet is initialized by electrically driving the tablet display to the color reflective texture with a voltage pulse or pulses. Then with a continuous voltage applied to the electrodes of an appropriate value, one can write images by driving the cholesteric material to the substantially transparent texture with the pressure of a pointed stylus. This mode of operation with a color reflective background is termed Mode A whereas the other mode with an essentially transparent background is termed Mode B.

The commercial Boogie Board® writing table, operated in Mode B, has the color black for the fixed opaque light absorbing background. The dark black background offers high contrast for the color reflective image written on the tablet. As disclosed in U.S. Pat. No. 5,493,430, other opaque colors may also be used for the fixed background of a cholesteric liquid crystal display. The color of the background additively mixes with the reflective color to present a different color than that of the cholesteric liquid crystal. There may be multiple colors on the background and those colors may be patterned. As an example, the pattern could be lines offering a lined tablet for convenience in writing text similar to a ruled paper tablet.

A problem with the prior art is that the background color and any background pattern on the tablet are fixed. One cannot change the background pattern; that is in the example of patterned lines, one cannot remove the lines for cases where text is not to be written. We disclose a different electronic display and tablet design whereby the background image can be changed.

BRIEF DESCRIPTION

One embodiment of this invention makes use of semi-transparent inks or color filters for the background of the tablet. For the purposes of this patent, the term semitransparent means: transparent to selected wavelengths of visible light with remaining wavelengths fully or partially absorbed. In this case, the semitransparent ink or color filter is used as a semitransparent light absorbing layer. The small absorption enhances the contrast of the cholesteric reflection when the image is written. Also, choosing certain color combinations of semitransparent ink and the peak of the cholesteric reflection can yield a new color not only for the written image, but also the background. The semitransparency of the display enables the use of templates or patterns to be placed behind the display for tracing or coloring in on the liquid crystal of the display. That is, coloring on the liquid crystal display over the pattern will appear as if one colored in the pattern using a colored marker in contact with the pattern. Except that the color reflected by the liquid crystal, the colors reflected, absorbed and transmitted through the semi-transparent back layer and the color of the pattern, will influence the colors seen by the viewer of the display. The ink coating or filter can also be used to reduce unwanted reflections between the back substrates and template. Colored templates can be used to change the background pattern, the color of the display and the color of the written image. In another embodiment the background of the tablet is replaced by an electronic skin, waveguide, or other device capable of exposing or hiding a pattern.

A first aspect of this disclosure features an electronic display including electrically conductive layers. An active layer is disposed between adjacent conductive layers, the active layer including cholesteric liquid crystal material. At least one transparent front substrate is disposed adjacent one of the electrically conductive layers near a front of the display. A semitransparent back layer absorbs light that passes through the active layer, reflects grey light or light of a color and is light transmitting. Electronic circuitry applies a voltage to the conductive layers that enables at least one of erasing or writing of the active layer. For example, the electronic circuitry can apply the voltage to the conductive electrodes so that the active layer is placed in a bright state, a dark state, a grey scale state or a state achieved when applying a write voltage Vw as described below.

Referring to specific features of the first aspect, any of the features of the Detailed Description may apply to the first aspect in any combination. Further, the voltage can be applied as a voltage pulse or a continuous voltage. A transparent back substrate can be disposed adjacent the semitransparent back layer. A portion of or an entire area of the electrically conductive layers can be patterned into a passive matrix. The passive matrix can comprise one of the conductive layers forming rows of substantially parallel electrode lines on one side of the active layer and another of the conductive layers forming columns of substantially parallel electrode lines on the other side of the active layer, wherein the columns are substantially orthogonal to the rows.

Moreover, the electronic display can be in a form of a decorative electronic skin. Also featured is an article comprising the electronic skin selected from the group consisting of cell phone, laptop, computer, computer monitor, computer mouse, computer keyboard, television, I-pod, MP3 player, PDA, video game controller, stereo, radio, CD player, appliance, toy, headphones, clock, handheld electronic devices, key ring accessory, shoe, purse, backpack, briefcase, computer case, computer covering, jewelry, watch, bottle, bottle lid, clothing, clothing embellishment, furniture, furniture embellishment, mobile entertainment case and combinations thereof.

Still further, a back pattern can be disposed behind the semitransparent back layer, wherein the back pattern is visible through the semitransparent back layer. The back pattern can be removable and selected from the group consisting of a template of a sports field, court or arena, a pattern for a children's game, an image for children to color, notepad lines, graph paper lines, or a menu of items that one can choose from. The back pattern can comprise a waveguide including light sources disposed at an edge thereof, and light emitting portions on a surface of the waveguide enable light to leave the waveguide in a pattern. The back pattern can comprises an emissive, backlit or reflective display device for displaying images.

A second aspect of this disclosure features a writing tablet including electrically conductive layers. At least one active layer is disposed in a gap between adjacent conductive layers. The active layer includes cholesteric liquid crystal material. An outer layer of flexible transparent material forms a writing surface. A semitransparent back layer absorbs light that passes through the active layer, reflects grey light or light of a color and is light transmitting. The active layer is adapted to enable writing pressure applied to the writing surface to reduce thickness of the gap to form a reduced gap region in which the liquid crystal is light reflecting so as to reflect light of a color or is essentially transparent. A texture of the liquid crystal is unchanged in a non-reduced gap region. Electronic circuitry applies an erasing voltage to the conductive layers for the active layer. The erasing voltage enables the liquid crystal of the active layer to be placed in a light reflecting texture so as to reflect light of a color or enables the liquid crystal of the active layer to be placed in an essentially transparent focal conic texture.

Referring to more specific features of the second aspect, any of the features of the first aspect, as well as any features of the Detailed Description, may apply in any combination. Further the electronic circuitry can apply a writing voltage to the electrically conductive layers. The writing pressure is applied while applying the writing voltage effective to place the reduced gap region of the active layer in the essentially transparent focal conic texture while not changing the texture of an unreduced gap region of the active layer.

Referring to a third aspect of this disclosure, a multicolor writing tablet includes electrically conductive layers. At least two or three active layers are stacked over each other each disposed in a gap between adjacent conductive layers. The active layers include cholesteric liquid crystal material. An outer layer of flexible transparent material forms a writing surface. A semitransparent back layer absorbs light that passes through the active layer, reflects grey light or light of a color and is light transmitting. The active layers are adapted to enable writing pressure applied to the writing surface to reduce thickness of the gaps to form reduced gap regions. Electronic circuitry applies erasing and writing voltages to the conductive layers for each of the active layers. The erasing voltage enables the liquid crystal of the active layer to be placed in a light reflecting texture so as to reflect light of a color or enables the liquid crystal of the active layer to be placed in an essentially transparent focal conic texture. The writing voltage enables writing in a color that is selected from any of the active layers by applying the writing voltage to the conductive layers for a non-selected active layer while applying the writing pressure to the writing surface, enabling the reduced gap region of the non-selected active layer to be in the essentially transparent focal conic texture. By not applying the writing voltage to the conductive layers for the selected active layer while applying the writing pressure to the writing surface, the reduced gap region of the selected active layer can reflect the color of the selected active layer.

Many additional features, advantages and a fuller understanding of the invention will be had from the accompanying drawings and the Detailed Description that follows. It should be understood that the above Brief Description describes the invention in broad terms while the following Detailed Description describes the invention more narrowly and presents specific embodiments that should not be construed as necessary limitations of the broad invention as defined in the claims.

BRIEF DESCRIPTION OF THE DRAWINGS

FIG. 2a-d: Illustrations showing a flexible display with a semitransparent medium forming a writing tablet for templates.

FIG. 3: Illustration of a writing tablet having a semitransparent back layer with a digital display.

FIG. 4: Illustration of a writing tablet having a semitransparent back layer with an image forming waveguide.

DETAILED DESCRIPTION

Figure 1A:
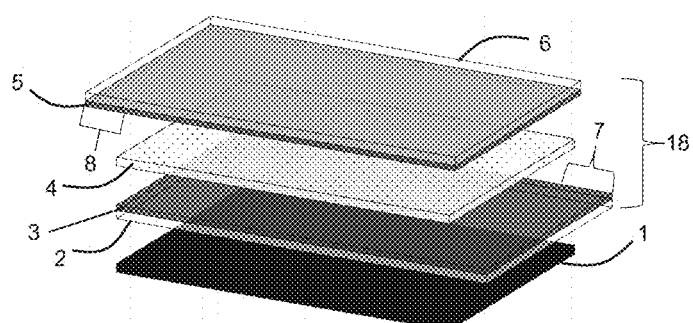
FIG. 1: Illustration showing the components of a commercially available Boogie Board® flexible cholesteric liquid crystal writing tablet of the prior art.
Figure 1B:
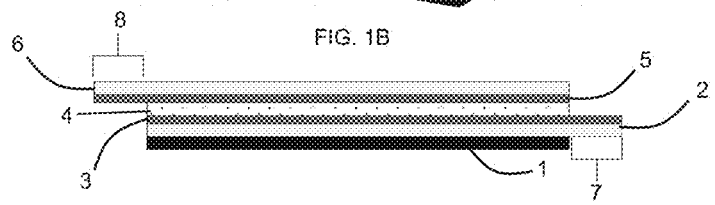

In a cholesteric display of the prior art such as the Boogie Board® writing tablet a fixed black opaque light absorbing medium is used to enhance the contrast of the display. Referred to as the display background, it is typically made by painting the backside of the lower substrate black. Referring to FIG. 1, this opaque coating 1 is placed on the bottom transparent plastic substrate 2 that is coated on its other surface with a transparent electrically conductive layer 3. The remainder of the display includes a layer 4 of a cured dispersion of liquid crystal, polymer and spacers, and another transparent top substrate 6 coated with a transparent electrical conductor 5. The bottom and top substrates are extended to create the bottom ledge 7 and top ledge 8. The transparent conductive layers 3 and 5 are exposed on the ledges 7 and 8, respectively, for connecting to drive electronics so that a voltage or voltage pulses may be applied across electrically conductive layers 3 and 5 as is necessary to initialize or erase an image or operate the display in Mode A, Mode B or select erase as described in U.S. Patent Application Publication Nos. 2009/0033811 and 2009/0096942, which are incorporated herein by reference in their entireties. A drawback of prior art cholesteric writing tablets has been the inability to change the background of the writing or drawing surface. For example, it is often desired to have a lined tablet as an aid for handwriting. As another example, in children's education it is often desired to have a figure for a child to trace or to play games.

Disclosed is an electronic display (e.g., a writing tablet) that provides a means for changing background images with surprisingly little loss in display contrast or brightness. A writing tablet utilizes a semitransparent back layer (e.g., a color filter) as the display background. The semitransparent layer reflects grey or light of a color; it also absorbs certain wavelengths of light; and light is also transmitted through the semitransparent layer. One method of making the semitransparent layer is by coating printing process inks on the back of a transparent substrate in place of the opaque absorbing ink of the prior art. The thickness of the ink coatings determines the level of transparency that can be anywhere from 0.1% to 99% for any given wavelength. Alternatively, it is possible to use a commercial color filter like Roscolux™ brand of filters from Rosco Laboratories Inc., as the back substrate; this will serve the same purpose as the coated ink. A semitransparent back layer enables a broader use for the writing tablet by employing templates, other sheet material, electronic skins, waveguides and even a digital display near the back layer to enable a changeable background for the display. Referring to FIG. 2, a writing tablet is constructed with upper transparent substrate 6 facing the viewer and a lower substrate 9 which is a color filter. Substrates 6 and 9 are coated with transparent electrically conductive layers 5 and 3, respectively. A preferred conductor for the electrically conductive layers is a conducting polymer because of its flexibility. Sandwiched between substrates 6 and 9 adjacent to the conductors is a cholesteric liquid crystal dispersion 4 as for example described in U.S. Patent Application Publication No. 2009/0033811, which is incorporated herein by reference in its entirety. The dispersion 4 controls the flow of the liquid crystal with a polymer network to have the proper sensitivity to the writing stylus. Instead of a dispersion, a polymer-free cholesteric liquid crystal 4 may be used with spacers in high density in the space between the electrodes to control flow and sensitivity as described in U.S. patent application Ser. No. 13/281,911, is incorporated herein by reference in its entirety. The color filter 9 is used as the bottom substrate, so that it is possible to view images on a template 10 or other objects placed behind the display 11. The semitransparent back layer may be realized by coating inks on a transparent substrate such as the 80 series inks from Norcote Corporation. The patterned layer or template 10 can be lines to aid in writing text on the tablet or it can be a figure such as a basketball court such as might be used by a coach to explain strategy and plays to his players. The template may also be figures for playing games or a learning aid for a child. The drive circuitry is connected to the electrically conductive layers on ledges 7 and 8 and can be identical to that described in U.S. Patent Application Publication Nos. 2009/0033811 and 2009/0096942, which are incorporated herein by reference in their entireties. The tablet can be driven in Mode A or Mode B as described in those patent application publications. With such a coating there is a loss in contrast over the prior art that utilizes a fixed opaque black back layer; however, this loss can be largely recovered with the template 10 that can be a replaceable color insert as will be described later. FIG. 2c further shows a top view illustration of the template 10 being inserted under the tablet 11. The template 10 is optional as the display can be used without it or with a variety of other components besides the template 10 which are limited only by the imagination of the user, such as a photograph or painting. FIG. 2d shows the display that includes electrically conductive rows 17 on the inside of one substrate and electrically conductive columns 18 on the inside of the other substrate, the rows and columns being orthogonal to each other. This forms a passive matrix that can be driven to form an image as known in the art.

The display 11 of FIG. 2 can also be used without a template as there is significant absorption from the semitransparent coating to enhance the cholesteric reflection contrast. To further enhance the contrast of the display without a template, one can simply replace the template with an insert that provides an opaque background. Surprisingly, the opaque background can be of any color or pattern even white. By changing the pattern or color of the removable background opaque insert one can change the color or appearance of the display.

The color of the semitransparent ink and filters can be used in combination with a template of another color to change the contrast and color of the display. For example, if a blue coated display is placed on a red template, the result from color subtraction is a blue background. On the other hand when the same display is placed on a yellow template, the result is green background. This is because the color of the display background is determined by the reflection of the remaining light after absorption by the coatings, filters and templates behind the liquid crystal dispersion 4. Since the coatings are produced by either absorptive filters or coated using absorptive inks, the display background color is the result of color subtraction of the coating 9 and template 10.

The color of the writing is determined by the additive mixing of the Bragg reflection wavelength of the liquid crystal dispersion layer 4 and the color reflected by the resultant color of the background. For example, if the cholesteric display is tuned to reflect yellow and a blue semitransparent background is used, the resultant writing from color addition will be white. This color mixing of the background color and the liquid crystal layer 4 is additive because there is no absorption of the reflected color by the liquid crystal layer 4.

To increase the usability of the display 11, a case can be built to ease the placement of the template 10. An example would involve adhering the display 11 to a rigid piece of semitransparent or clear plastic with a holding mechanism for the template 10. The holding mechanism can be either, a removable glue, a mechanical fastener or simply a slot in the plastic that will allow the template to rest below the display. The piece of plastic separating the display 11 from the template can be of any thickness including 0 mm, but the quality of the template image would suffer the further it is from the display 11.

Further, the display 11 described in FIG. 2 can be placed on a reflective, backlit or emissive back display so that any image or pattern can be placed behind the display. Referring to FIG. 3, the display 11 is placed on top of an electronic back display 14, which is in a dark state when there is no image on the screen. The back display may be a reflective, backlit or an emissive display. Images on reflective displays are visible because of ambient light interacting with each of the display pixels and either getting reflected back or being absorbed. Therefore, to produce a dark image all the pixels are switched so that all the incident light is absorbed. Displays that are backlit produce images because the light behind each pixel is either transmitted to the viewer or not transmitted. To produce a dark image, all the pixels block the light from the backlight from reaching the viewer. In this case where there is no image and the screen is dark, the writing tablet 11 has no pattern as illustrated in FIG. 3b. When a stylus or finger nail is used to write an image on the display, the result is a written image whose color depends on the additivity of the reflectivity of the cholesteric mixture in the dispersion layer 4 and the color of the semitransparent coating. Referring to FIG. 3c, the electronic back display 14 is displaying an image; this image shows through the writing tablet 11. Due to the location of the semitransparent coating, the writing tablet performs better than a display with no coating, because the absorptive layer is closer to the cholesteric layer, hence enhancing the reflection of the written texture. The color of the image on the back display 14 showing through the writing tablet 11 will depend on the back semitransparent color 9 and whether the back display 14 is emissive, reflective or backlit. For example, if the back display 14 is emissive or backlit, the color of the background showing through writing tablet 11 will be a result of the subtraction of the original image color on the back display 14 after it goes through the semitransparent ink on the writing tablet 11. The emissive or backlit back display will have to be dimmed so that it does not overwhelm the contrast of the image written on writing tablet 11. If the back display 14 is reflective, the image through the writing tablet 11 will be of the same result as placing a template 10 under the writing tablet as described in FIG. 2 above. The writing tablet can also be placed on a light guide like that which is sourced from Flashing LED Board™ through ledflashingboard.com sold as a Multi Color LED Message Board model #OCGDB1210. The light guide could have a pattern either permanently etched on the top of it so as to allow light leakage or temporarily marked so as to allow the same.

Referring to FIGS. 4a and 4b, when the writing tablet 11 is placed on this light guide 15, there is no image showing through the writing tablet because the lights 16 needed to illuminate the pattern on the light guide are turned off. In FIG. 4c, the lights 16 are turned on and the image on the light guide 15 is illuminated and shows through the writing tablet 13.

Note that the light guide can be patterned in such a way that the whole background of the display can be illuminated. Using different colored lights, the color of the background can be changed with a flick of a switch.

The following sections of the specification, excluding the examples, have been excerpted and modified from U.S. patent application Ser. No. 12/152,729, entitled "Multiple Color Writing Tablet," which is incorporated herein by reference in its entirety. The main modification is the fixed light absorbing layer of the '729 patent application can be replaced by a semitransparent back layer and an optional patterned layer can be employed behind the semitransparent layer. Also, one option is to employ at least one patterned ink layer in the writing tablet as disclosed in the patent entitled "Electronic Display with Patterned Layer,", U.S. Pat. No. 9,235,075, which is incorporated herein by reference in its entirety.

Figure 6:
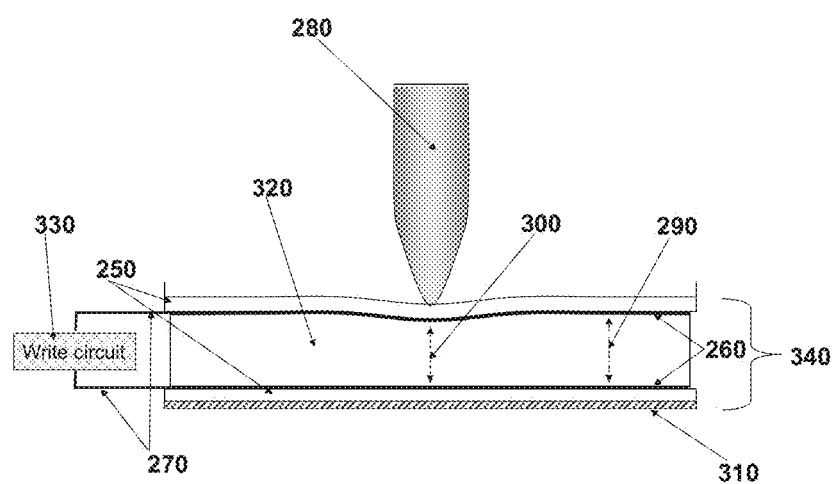
FIG. 6: Illustration of a writing tablet cell with a semitransparent back layer.

Cell Having Focal Conic Written Portion on Planar Background:

Another embodiment of this disclosure is a writing tablet in which the background state is the planar texture and the line created by the pressure of the stylus is in the focal conic texture. The bistable cholesteric writing tablet is illustrated in FIG. 6 and includes substrates 250 of transparent, flexible material in which plastic is preferred. The inner surface of the substrates are coated with transparent conductive electrodes 260 from materials such an indium tin oxide (ITO) or a conducting polymer such as PEDOT. Sandwiched between the adjacent electrodes is a bistable cholesteric material 320.

In FIG. 1, all of the electrodes and substrates are transparent, except for the electrode and any substrate nearest to the light absorbing back layer 1 (e.g., lower electrode 3 and lower substrate 2), which can be transparent or opaque. In FIG. 6 there is a semitransparent coating 310 at the bottom of the display.

In this embodiment in which the liquid crystal is initially in the planar texture, flow of the liquid crystal is not required for the inventive cell to form the focal conic texture using the pressure of a stylus. The droplets can be confined as separate droplets within the dispersion or the droplets can be unconfined with interconnecting droplets. The dispersions may be of the type prepared by water borne emulsions or by polymerization induced phase separation (PIPS) as is known in the art. The image is created by the unique electro-optic characteristics of the cell rather than by flow to be described later. The conducting electrodes 260 are connected with electrical interconnects 270 to electronic write (and erase) circuitry 330 that provides suitable voltages to the conducting electrodes 260, usually in the form of a pulse, in order for pressure of the stylus to create an image.

Figure 7:
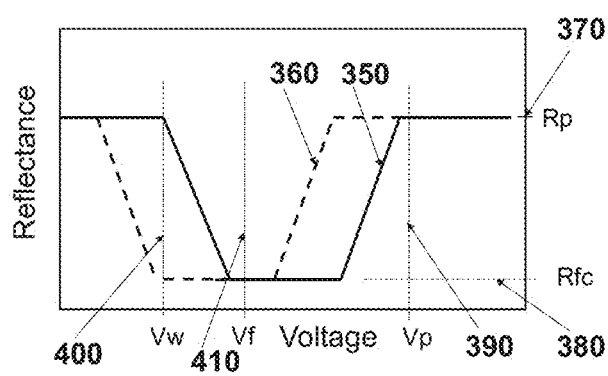
FIG. 7: Illustration of the voltage response curves used in describing the invention (with voltage increasing toward the right of the figure and reflectance increasing toward the top of the figure)

In order to explain the function of the writing circuitry 330 of FIG. 6 we turn to FIG. 7. FIG. 7 is an illustration of the typical and hypothetical voltage response shown as the Reflectance of the cell versus the Voltage of a pulse applied to the cell. There are two curves illustrated in the voltage response of FIG. 7: a solid curve 350 for the cell with an undepressed cell gap 290 and a dashed curve 360 for a reduced cell gap spacing 300 (the depressed and reduced cell gaps being shown in FIG. 6). In both the solid 350 and the dashed 360 curves of FIG. 7, the maximum light reflectance of the planar texture is indicated by Rp 370 whereas the minimum light reflectance of the focal conic texture is indicated by Rfc 380. As illustrated in FIG. 7 the effect of the pressure from the stylus is to shift the voltage response from the solid curve 350 to the dashed curve 360.

The procedure of writing an image on the inventive cell is to first erase all previous images by applying an erasing voltage of value Vp indicated by vertical line 390 to drive the cell initially to the planar texture. The value of the voltage or magnitude of a voltage pulse to do this is well known in the art of a bistable cholesteric liquid crystal displays; e.g., U.S. Pat. Nos. 5,453,863 and 5,691,795. This erases the writing tablet to the reflective planar texture so that the background color of the writing tablet is a color additive mixture of the reflective color of the cholesteric material 320 with the color of the semitransparent back layer 310 of FIG. 6.

In order to write an image using stylus 280 a voltage, Vw, is applied by the write circuit 330. The value of Vw is indicated by vertical line 400 of FIG. 7. The voltage is applied for the duration of the stylus write; preferably a continuous AC voltage or a sequence of bipolar pulses. The voltage is applied to the patterned or unpatterned electrodes so that the entire display area of liquid crystal seen by the user of the writing tablet, has an electric field applied to it. It is seen by curve 360 in FIG. 7 that a voltage Vw 400 will drive that area of the cell to the focal conic texture; that is, areas of the cell under the stylus where pressure is applied and cell gap is reduced. The planar texture in that area is driven to the focal conic texture as illustrated by the dashed curve 360. In the remainder of the cell where the cell gap is not disturbed, even though the electric field has been applied here, the material will remain in the planar texture as indicated by the solid curve 350, leaving a planar background for the focal conic writing. In other words, the liquid crystal material where the cell gap is undisturbed remains in the planar texture as shown where line Vw intersects the solid line 350 (undepressed cell gap) while the voltage Vw is applied to the electrodes and is not converted to the focal conic texture. The write circuit 330 can also provide an erasing voltage Vp to erase the entire tablet. It is seen by FIG. 7 that a voltage Vp 390 will drive the entire cell to the planar texture, erasing the focal conic writing. The voltage may be an AC voltage pulse or a sequence of pulses, preferably bipolar pulses.

References to writing "on a background" used in this disclosure means writing a black or color line on the writing tablet in which a majority of the display area has the background color or is black, and does not mean that the background must be physically behind the writing or formed by a color of the light absorbing back layer. When the word "image" is used in this disclosure it means any black or color line and any black or color background on the writing tablet, together with the design or pattern of the template 10 in FIG. 2, back display 14 in FIG. 3 or waveguide 15 in FIG. 4. When we say "selecting a cell" or "writing on a cell" in this disclosure, that means selecting the writing color to include the color reflected by that cell. It will be appreciated as described above that the color of the display background and writing will be affected by the color of the semitransparent ink 310 and template 10 in FIG. 2, back display 14 in FIG. 3 or waveguide 15 in FIG. 4.

Figure 8:
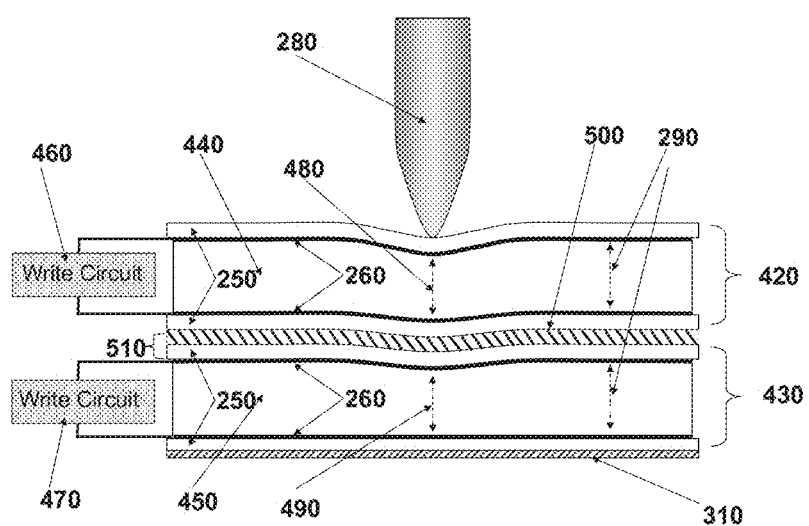
FIG. 8: Schematic illustration of a double stack multicolor writing tablet with a semitransparent back layer.

II. Double Cell Writing Tablet:

We now turn to a second embodiment of the invention featuring a multiple-color tablet in which two active layers are stacked over each other (FIG. 8). The active layers can be stacked such that each cell reflects a different planar reflective color and images can be written separately on each cell with a single stylus to create multiple color images on the writing tablet. The cholesteric material of the cells each has a pitch length selected to reflect any color; preferably the colors reflected by the two cells are different than each other. Primary such reflective colors can be mixed to create a variety of colors subject to the innovation of the user. The writing tablet enables a single untethered stylus to write or draw figures in different colors as selected by the user. Writing of different colors can be achieved in at least two ways: a first Mode A in which planar texture color writing is presented on a planar texture background; and a second Mode B in which planar texture color writing is presented on a focal conic background, preferably a color provided by the semitransparent ink layer. Each of these modes works on a different physical principle of the cholesteric liquid crystal and will be described separately below.

The double cell writing tablet device can be made with either stacked separate cells or as a single unit sharing substrates. The word "cell" as used herein means an active layer, the electrodes on either side of it, and any substrates flanking the electrodes (i.e., on either side of the electrodes). In FIG. 8, completed cells 420 and 430 comprising different color active layers can be stacked as separate units each having separate substrate 250 with an electrode 260 on an inside surface of it, the internal substrates 250 being joined with an index matching material 500 in between them. Likewise, the stacked cells can be made as a single unit that shares a common substrate between the active layers 440 and 450, in which case the component structure having interior electrodes 260 on each interior substrate 250 with index matching material 500 between these substrates is replaced by a single substrate designated 510 with two electrodes 260 disposed on either side of it.

IIa. Double Cell Writing Tablet in Mode A:

In describing Mode A, we refer to FIG. 8 which is an illustration of a writing tablet having double stack cells. The multiple-color double-stack tablet of FIG. 8 is made up of two cells, cell 420 stacked on top of cell 430. Cell 420 is of the same construction as cell 340 of FIG. 6 containing transparent substrates 250 with transparent conducting electrodes 260, connected to a writing circuit 330; however the semitransparent ink coating 310 is absent. Cell 420 is stacked on top as well as optically coupled to cell 430 so as to match the index of refraction of adjacent substrates. One means of optical coupling is with a thin layer of optical index matching fluid 500 between cells 420 and 430. Cell 430 is also identical in construction to cell 340 of FIG. 6 with transparent substrates 250 and transparent conducting electrodes 260 that are electrically connected to writing circuit 330 as well as containing a semitransparent background coating 310.

Cells 420 and 430 are filled with a cholesteric liquid crystal material 440 and 450, respectively. However, the cholesteric material within each cell has a different reflective color than the other cell. For example, the liquid crystal of cell 420 may be a cholesteric material that reflects blue light while the liquid crystal of cell 430 is a cholesteric material that reflects yellow light. In certain applications it may be desired that materials 440 and 450 have a different handedness for the helical twist; that is, one cell reflects right handed circular polarization and the other left. Like the cholesteric material 320 of FIG. 6, the cholesteric materials 440 and 450 of FIG. 8 are preferred to be in the form of a polymeric dispersion. The droplets can be confined as separate droplets within the dispersion since flow of the liquid crystal is not required for this embodiment of the multiple color writing tablet. Materials 440 and 450, however, may also be a droplet dispersion in which the droplets are unconfined with interconnecting droplets since flow will not affect its operation. The dispersions may be of the type prepared by water borne emulsions or by polymerization induced phase separation as is known in the art.

A procedure of writing a multicolor image on the double stack tablet in Mode A is to first erase all previous images by activating both write circuits 460 and 470 to apply voltages of value Vp indicated by vertical line 390 (FIG. 7) to drive both cells 420 and 430 into the planar texture. The value of the voltage or magnitude of a voltage pulse to do this is well known in the art of a bistable cholesteric liquid crystal displays; e.g., U.S. Pat. Nos. 5,453,863 and 5,691,795. This erases the multi-color writing tablet to the reflective planar texture so that the background color of the writing tablet is a color additive mixture of the reflective colors of the cholesteric materials 420 and 430 and any color of the semitransparent back layer 310.

In order to write an image of the color of the cholesteric 440 on the top cell 420 by stylus 280 in Mode A, a voltage Vw must be applied by the write circuit 470 of the bottom cell 430 during the writing process. The value of Vw is indicated by vertical line 400 of FIG. 7. The voltage is applied for the duration of the stylus write; preferably a continuous AC voltage or a sequence of bipolar pulses. It is seen by curve 360 of FIG. 7 that a voltage Vw 400 will drive the bottom cell to the focal conic texture only in the vicinity of the stylus where pressure is applied and the cell gap is reduced. This removes the planar texture of the liquid crystal 450 in the bottom cell 430 under the stylus (i.e., in reduced gap regions). In the remainder of the bottom cell 430 where the cell gap is not disturbed, the material will remain in the planar texture as indicated by the solid curve 350. Because no voltage is applied to the electrodes for the upper cell 420, the liquid crystal 440 of the upper cell is not changed from the planar texture. This forms an image composed of a written portion (region where pressure is applied by the stylus to the writing surface) containing only the reflected light of the color of the cholesteric 440 of top cell 420 (added with any color of the semitransparent coating 310, referred to as a "back color") on a background color (formed by the undepressed (unwritten) regions of both cells) that is an additive mixture of the colors of the planar textures of both cells (along with any back color) in cooperation with the template 10 in FIG. 2, back display 14 in FIG. 3 or waveguide 15 in FIG. 4.

In order to write an image of the color of the cholesteric 450 on the bottom cell 430 by stylus 280 in Mode A, a voltage Vw is applied by the write circuit 460 to the top cell 420 while the writing pressure is applied to the writing surface. The value of Vw is indicated by vertical line 400 of FIG. 7. The voltage is applied for the duration of the stylus write; preferably a continuous AC voltage or a sequence of bipolar pulses. It is seen by curve 360 of FIG. 7 that a voltage Vw 400 will drive the cholesteric 440 of the top cell 420 to the focal conic texture in the vicinity of the stylus where pressure is applied (i.e., at the written portion of the writing tablet) as the cell gap is reduced. In the remainder of the top cell where the cell gap is not disturbed, the material will remain in the planar texture as indicated by the solid curve 350. Therefore, the image will be composed of the written portion formed by colored light reflected from the planar texture of the cholesteric 450 of only the bottom cell 430 (added to any color of the back layer) in cooperation with the pattern or design of the template 10 in FIG. 2, back display 14 in FIG. 3 or waveguide 15 in FIG. 4. The written portion will be apparent on a background color (formed by the undepressed regions of both cells) that is an additive mixture of the colors of the planar textures of both cells (along with any background color) in cooperation with the design or pattern of the template 10 in FIG. 2, back display 14 in FIG. 3 or waveguide 15 in FIG. 4.

In Mode A, the write circuits 460 and 470 can be used to erase the tablet by providing a voltage Vp to each of cells 420 and 430. It is seen by FIG. 7 that a voltage Vp 390 will drive each of the cells entirely to the planar texture. The voltage may be an AC voltage pulse or a sequence of pulses, preferably bipolar pulses.

IIb. Double Cell Writing Tablet in Mode B

In describing Mode B, we again refer to FIG. 8. The writing tablet is identical to that described above except that the initial state of both cells is focal conic and the cholesteric materials are in the form of a polymeric dispersion that will allow localized flow caused by the writing pressure from a pointed instrument such as a pointed untethered stylus to induce the planar texture. Droplets that are unconfined or are interconnecting allow liquid crystal flow to occur under the pressure of the stylus 280 in reduced cell gap regions 480 and 490. Flow does not occur and the liquid crystal texture does not change in undepressed regions 290.

A suitable voltage applied to the electrodes will drive the cholesteric material of both cells to the initial focal conic state (see FIG. 7). When viewed from above, the tablet will exhibit the color of the semitransparent background coating 310 along with the template 10 in FIG. 2, back display 14 in FIG. 3 or waveguide 15 in FIG. 4 since the focal conic texture is essentially transparent in this cell configuration. The pressure from the pointed stylus 280 in the locally reduced cell gap spacing 480, 490 induces flow in the cholesteric material that changes the cholesteric texture from the transparent focal conic to the color reflective planar texture in the vicinity of the tip of the stylus 280. The stylus is used to draw an image similar to drawing with a pencil on paper. The written image can then be entirely erased by applying a voltage pulse to the electrodes of sufficient value to drive all the material to the focal conic state (see FIG. 7 and the '448 patent for suitable voltage to apply to each liquid crystal layer).

The procedure of writing a multicolor image on the double stack writing tablet of Mode B is to first erase all previous images by activating both write circuits 460 and 470 to apply voltages of value Vf indicated by vertical line 410 of FIG. 7 to drive both cells 420 and 430 into the focal conic texture. The value of the voltage or magnitude of a voltage pulse to do this is well known in the art of a bistable cholesteric liquid crystal displays; e.g., U.S. Pat. Nos. 5,453, 863 and 5,691,795. In order to write an image reflecting the color of the cholesteric 440 on the top cell 420 only using stylus 280 a voltage Vw is applied by the write circuit 470 to the electrodes of the bottom cell 430 during the writing process. The value of Vw is indicated by vertical line 400 of FIG. 7. The voltage is applied for the duration of the stylus write; preferably a continuous AC voltage or a sequence of bipolar pulses. The purpose of the voltage is to maintain the focal conic texture of the bottom cell 430 under the action of the stylus (i.e., prevent forming the planar texture in the written portion or depressed cell gap region of the bottom cell). While this voltage is applied the pressure of the stylus does not induce a planar texture in cell 430 but maintains its focal conic texture during the writing process. The stylus does, however, induce a planar texture in the cholesteric 440 of the upper cell 420 in its vicinity (i.e., in the writing portion) that is believed to be due to lateral flow of the cholesteric liquid crystal in the reduced gap regions resulting in the focal conic texture being transformed to the planar texture. This occurs without any voltage being applied to the upper cell. Therefore, an image on a focal conic background, in cooperation with the patterned layer, on a stacked multicolor cell is possible by suitably applying a voltage to allow the image to be written on only one cell. The image is composed of the writing portion at a color of the light reflected from the planar texture of the cholesteric 440 of the top cell 420 (added to any color of the semitransparent back layer 310) on the unwritten and undepressed background (semitransparent back color of the back layer) in cooperation with the template 10 in FIG. 2, back display 14 in FIG. 3 or waveguide 15 in FIG. 4.

Similarly, in order to form an image on the bottom cell 430 only by stylus 280 a voltage Vw must be applied by the write circuit 460 to the electrodes of the top cell 420 during the writing process. As before, both cells are initially in the focal conic texture. The value of Vw is indicated by vertical line 400 of FIG. 7. The voltage is applied for the duration of the stylus write; preferably a continuous AC voltage or a sequence of bipolar pulses. The purpose of the voltage is to maintain the focal conic texture of the top cell 420 under the action of the stylus. While this voltage is applied the pressure of the stylus does not induce a planar texture in top cell 420 but maintains its focal conic texture from the erasure process. The stylus does, however, induce a planar texture in the bottom cell 430 due to induced lateral flow of the cholesteric liquid crystal (without applying voltage to the bottom cell), resulting in the focal conic texture being transformed to the planar texture in the reduced cell gap region of the bottom cell (i.e., in the written portion). This produces an image composed of the writing portion at a color of the light reflected from the planar texture of the cholesteric 450 bottom cell 430 (added to any color of the semitransparent back layer 310) on the unwritten and undepressed background (semitransparent back color of the back layer) in cooperation with the template 10 in FIG. 2, back display 14 in FIG. 3 or waveguide 15 in FIG. 4. Therefore, a planar image on a focal conic background can be selectively written separately on each cell of the stack to produce a multiple color image.

IIe. Multimode Double Cell Writing Tablet:

The inventive writing tablet can also be designed so that one of the cells operates according to Mode A and the other cell operates according to Mode B. That is, one cell has an initial planar texture while the other cell has the initial focal conic texture. Writing in a color of only one of the cells (added to any back color) in cooperation with the template 10 in FIG. 2, back display 14 in FIG. 3 or waveguide 15 in FIG. 4 is selected by applying the write voltage Vw to the other cell while writing pressure is applied. The background will have the color of the undepressed regions of the planar cell (added to any back color) in cooperation with the template 10 in FIG. 2, back display 14 in FIG. 3 or waveguide 15 in FIG. 4. For example, when a first cell desired to be selected is in the initial focal conic texture, the other second cell in the planar texture has the writing voltage Vw applied during the writing process. The planar texture is erased from the second layer in the written portion where the cell gap is reduced, as Vw is applied. The writing process forms the planar texture in the written portion of the first layer where the cell gap is reduced. The resulting image will be the written portion at the planar texture of the first layer only (added to any semitransparent back layer color) on a background formed by the planar texture of undepressed regions of the second layer (added to any semitransparent background color). Both the written portion and background cooperate with template 10 in FIG. 2, back display 14 in FIG. 3 or waveguide 15 in FIG. 4.

Another way to form an image on the multimode, two layer writing tablet is by applying the write voltage to both cells, in effect, selecting the background. Upon writing, the planar texture is prevented from being formed in the written portion of the focal conic layer and the planar texture is erased to the focal conic in the written portion of the planar layer. This forms an image composed of a written portion in black or any back color on a background of the color reflected by the planar layer (added to any background color). The written portion and background cooperate with the template 10 in FIG. 2, back display 14 in FIG. 3 or waveguide 15 in FIG. 4.

Yet another way to form an image on the multimode, two layer writing tablet is by not applying the write voltage to either layer. The writing process will form the planar texture in the written portion of the focal conic layer and will not affect the planar texture existing in the written portion of the other planar layer. This will result in an image that is the addition of the colors reflected from both layers in their written portions (along with any semitransparent back color) on a background that is the color of light reflected from the planar layer (added to any semitransparent back layer color). Both the written portions and background cooperate with the template 10 in FIG. 2, back display 14 in FIG. 3 or waveguide 15 in FIG. 4.

It should be apparent from the foregoing that the cells can be designed the same or differently by changing the liquid crystal dispersion. In the initially planar cell, liquid crystal flow is not needed to change the planar texture to the focal conic in the layer where the writing voltage is applied. Therefore, the liquid crystal of this cell can be in confined droplets or in a dispersion of liquid crystal in a polymer matrix that does not encapsulate or confine the liquid crystal enabling it to flow. However, the liquid crystal in the initially focal conic cell must be in a dispersion that enables it to flow upon application of pressure from a pointed stylus. This allows the writing tablet to be formed from cells using different combinations of liquid crystal dispersions. For example, a writing tablet could be made so that both cells only have confined droplets of liquid crystal material in a polymer matrix using a PIPS process and will only operate in Mode A only. A writing tablet formed of unconfined droplets in both cells, or a writing tablet having a focal conic cell having unconfined droplets and confined or unconfined liquid crystal in the planar cell, could operate in Mode A, Mode B or in as a multimode writing tablet.

It should be appreciated in reading this disclosure that the writing tablet of this disclosure can have more than two liquid crystal layers as in the case of a triple stack display disclosed in the Ser. No. 12/152,729 patent application, which can have liquid crystal layers reflecting red, green and blue, respectively, in any order.

The description will now refer to the following examples which should not be used to limit the broad invention as described by the claims.

Example 1

Figure 5A:
FIG. 5A: Photograph of a blue display having a semitransparent back layer.
Figure 5B:
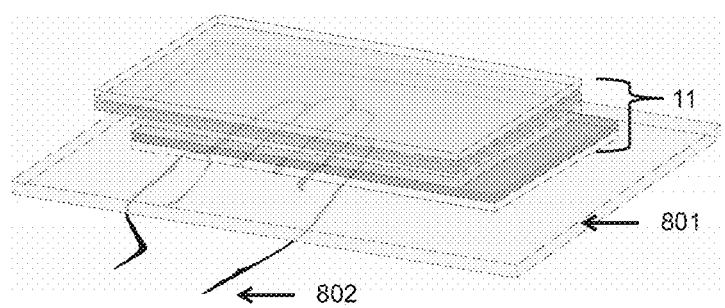
FIG. 5B: Illustration of the electronic display of FIG. 5A including the semitransparent back layer which forms a bottom surface of the display, or a semitransparent or clear layer below the semitransparent back layer forms a bottom surface of the display; the writing tablet is shown placed over a hand.

A Boogie Board™ writing tablet purchased from a Brookstone retail store was disassembled so that the opaque coating from the back substrate could be removed. The removal of the ink was done using a methanol wipe. After cleaning, the display was coated with Norcote brand blue process ink, forming the semitransparent back layer. Once the ink was dried, the display and electronics were assembled on a thin sheet of clear acrylic. The result of this process changes the display from a writer with yellow writing on a black background to one with yellow writing on a semitransparent blue background. A photograph of the resulting writing tablet is shown in FIG. 5A. FIG. 5B shows a side view of the writing tablet photographed in FIG. 5A including a representative article (a hand 802) over which the writing tablet is placed for viewing the article. The article is free of attachment to the writing tablet. The writing tablet includes the components 11 (e.g., as in FIG. 2), and the optional polymer layer 801 made of acrylic. The bottom of the writing tablet can be formed by the semitransparent back layer of the component 11, or by the polymer layer 801 which could be clear or semitransparent.

Example 2

Figure 9:
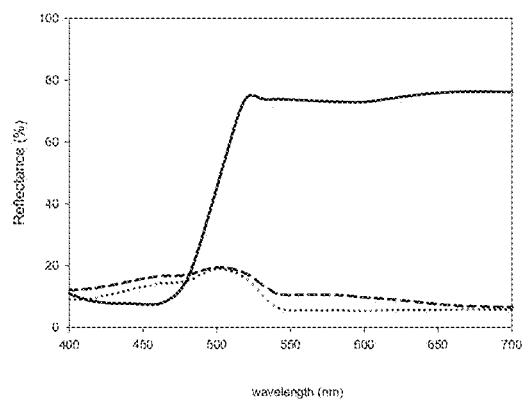
FIG. 9: Reflection spectra of a writing tablet having a blue semitransparent back layer on a yellow template.

In FIG. 9, the reflection spectra of a solid yellow template is shown by the solid line. When a writing tablet with blue semitransparent backcoat, operating in the B mode, is placed on the template, the region with no writing (focal conic or dark state) has a reflection spectra shown by the dotted line. This resultant spectra is due to color subtraction of the yellow template spectra by the blue semitransparent coating that cut off most of the reflected light beyond 500 nm and also absorption of some of the light by the template in wavelengths less than 450 nm. The written region would show a reflection spectra shown by the dashed line, which includes the result of color subtraction of the yellow template and blue coating in cooperation with color addition due to the liquid crystal layer reflecting light between 485-640 nm.

Example 3

Figure 10:
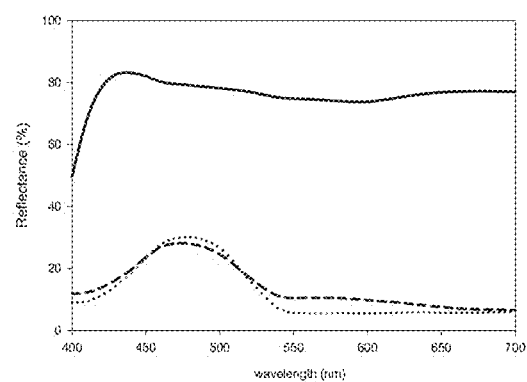
FIG. 10: Reflection spectra of a writing tablet having a blue semitransparent back layer on a white template.

In FIG. 10, the reflection spectra of a solid white template is shown by the solid line. When a writing tablet with blue semitransparent backcoat, operating in the B mode, is placed on the template, the region with no writing (focal conic) has a reflection spectra shown by the dotted line. This resultant spectra is due to color subtraction of the white spectra by the blue semitransparent coating that cut off most of the reflected light beyond 550 nm and lets about 30% of the light at around 475 nm. The written region would show a reflection spectra shown by the dashed line, which includes the result of color subtraction from the blue coating in cooperation with color addition due to the liquid crystal layer reflecting light between 485-640 nm.

Figure 11:
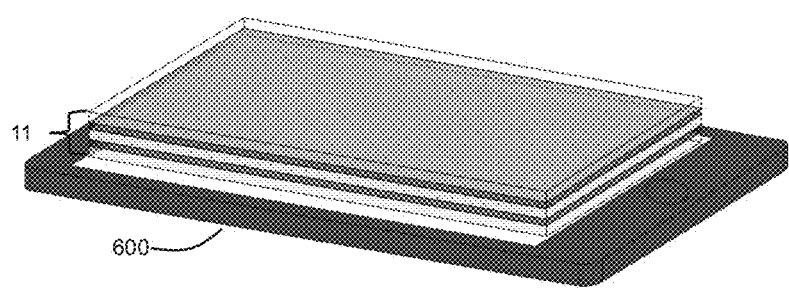
FIG. 11 shows an article including an electronic display of this disclosure.

FIG. 11 shows an article generally represented by 600 including electronic skin liquid crystal display 11 of this disclosure. The article 600 is selected from the group consisting of cell phone, laptop, computer, computer monitor, computer mouse, computer keyboard, television, I-pod, MP3 player, PDA, video game controller, stereo, radio, CD player, appliance, toy, headphones, clock, handheld electronic devices, key ring accessory, shoe, purse, backpack, briefcase, computer case, computer covering, jewelry, watch, bottle, bottle lid, clothing, clothing embellishment, furniture, furniture embellishment, mobile entertainment case and combinations thereof.

Figure 12:
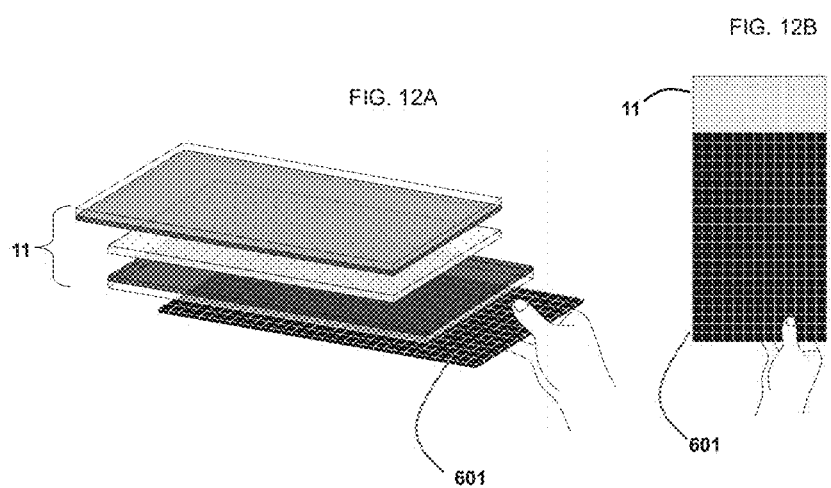
FIGS. 12a and 12b show an electronic display of this disclosure including a semitransparent back layer showing any removable back pattern behind it, such as one including notepad lines, for example, graph paper.

FIGS. 12a and 12b show an electronic display of this disclosure including a semitransparent back layer showing any removable back pattern generally depicted by 601 used behind it, such as one including notepad lines, for example, graph paper.

Figure 13:
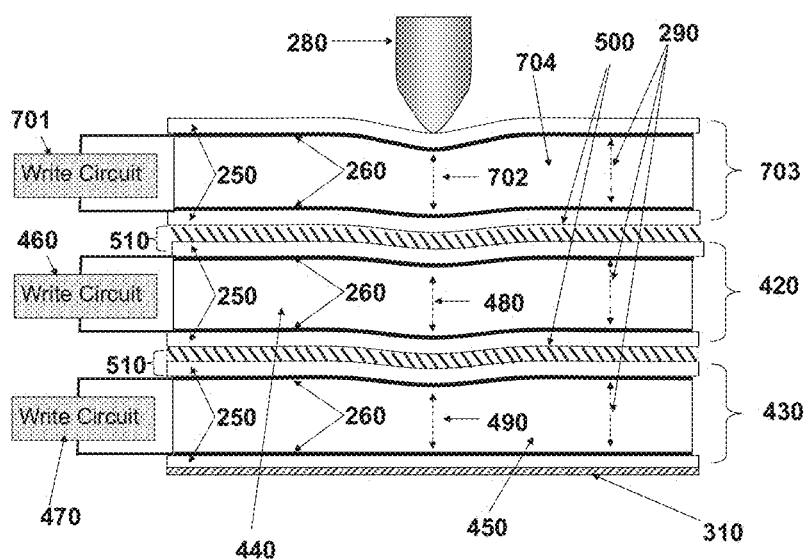
FIG. 13 shows an electronic display of this disclosure including three stacked liquid crystal layers.

FIG. 13 is the same as FIG. 8 but shows three cholesteric liquid crystal components 703, 420 and 430. The figure differs from FIG. 8 in the addition of upper component 703 which includes liquid crystal layer 704 sandwiched between transparent substrates 250, the substrates including electrically conductive layers 260 on their inside surfaces, the liquid crystal being driven or erased by write circuit 701. The other features of the display are the same as discussed above in connection with FIG. 8 with the same elements having the same reference numbers. The liquid crystal layers 704, 440, 450, reflecting a different one of red, green and blue, in any order. The semitransparent layer 310 is disposed behind the three stacked liquid crystal layers and other indicated components.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. An electronic display comprising:
   electrically conductive layers;
   an active layer disposed between adjacent said electrically conductive layers, said active layer including cholesteric liquid crystal material;
   a transparent front substrate disposed adjacent one of said electrically conductive layers near a front of said display;
   a semitransparent back layer that absorbs light that passes through said active layer, reflects grey light or light of a color and is light transmitting, wherein said semitransparent back layer comprises one of: ink coated on a transparent substrate; and a transparent substrate including ink;
   wherein said semitransparent back layer forms a bottom surface of said display, or a semitransparent or clear layer below said semitransparent back layer forms a bottom surface of said display; and
   electronic circuitry for applying a voltage to said electrically conductive layers that enables at least one of erasing or writing of said active layer.

2. The electronic display of claim 1 comprising three of said active layers which reflect red, green and blue light, respectively, each of said active layers being disposed between adjacent said electrically conductive layers.

3. An electronic display comprising:
   electrically conductive layers;
   an active layer disposed between adjacent said electrically conductive layers, said active layer including cholesteric liquid crystal material;
   a transparent front substrate disposed adjacent one of said electrically conductive layers near a front of said display;
   a semitransparent back layer that absorbs light that passes through said active layer, reflects grey light or light of a color and is light transmitting, wherein said semitransparent back layer comprises ink or a colored filter;
   wherein said semitransparent back layer forms a bottom surface of said display, or a semitransparent or clear layer below said semitransparent back layer forms a bottom surface of said display; and
   electronic circuitry for applying a voltage to said electrically conductive layers that enables at least one of erasing or writing of said active layer;
   wherein said display is adapted to be used with a back pattern that is removably disposed behind said semitransparent back layer, wherein said back pattern is visible through said semitransparent back layer.

4. The electronic display of claim 3 wherein said back pattern comprises a waveguide including light sources disposed at an edge thereof, and light emitting portions on a surface of said waveguide enabling light to leave said waveguide in a pattern.

5. The electronic display of claim 3 wherein said back pattern comprises an emissive, backlit or reflective display device for displaying images.

6. The electronic display of claim 3 wherein said back pattern is removably held to said electronic display.

7. The electronic display of claim 3 wherein said semitransparent back layer includes one color, said active layer includes said cholesteric liquid crystal that reflects another color and said back pattern includes yet another color.

8. The electronic display of claim 3 wherein said back pattern is selected from the group consisting of: a template of a sports field, court or arena, a pattern for a children's game, an image for children to color, notepad lines, graph paper lines, and a menu of items that one can choose from.

9. An electronic display comprising:
electrically conductive layers;
an active layer disposed between adjacent said electrically conductive layers, said active layer including cholesteric liquid crystal material;
a transparent front substrate disposed adjacent one of said electrically conductive layers near a front of said display;
a semitransparent back layer that absorbs light that passes through said active layer, reflects grey light or light of a color and is light transmitting, wherein said semitransparent back layer comprises ink or a colored filter;
wherein said semitransparent back layer forms a bottom surface of said display, or a semitransparent or clear layer below said semitransparent back layer forms a bottom surface of said display; and
electronic circuitry for applying a voltage to said electrically conductive layers that enables at least one of erasing or writing of said active layer;
wherein said display is adapted to be placed over a variety of articles for viewing, the articles being free of attachment to said display.

10. A writing device comprising:
electrically conductive layers;
at least one active layer disposed in a gap between adjacent said electrically conductive layers, said active layer including bistable cholesteric liquid crystal material;
an outer layer of flexible transparent material forming a writing surface;
wherein said active layer is adapted to enable writing pressure applied to said writing surface to reduce thickness of said gap to form a reduced gap region in which the liquid crystal is light reflecting so as to reflect light of a color or is essentially transparent, a texture of said liquid crystal being unchanged in a non-reduced gap region; and
a semitransparent back layer that absorbs light that passes through said active layer, reflects grey light or light of a color and is light transmitting, wherein said semitransparent back layer comprises one of: ink coated on a transparent substrate; and a transparent substrate including ink;
wherein said semitransparent back layer forms a bottom surface of said writing device, or a semitransparent or clear layer below said semitransparent back layer forms a bottom surface of said writing device.

11. The writing device of claim 10 comprising electronic circuitry for applying a voltage to said electrically conductive layers that enables at least one of erasing or writing of said active layer.

12. The writing device of claim 11 wherein said electronic circuitry applies a writing voltage to said electrically conductive layers, said writing pressure being applied while applying said writing voltage effective to place said reduced gap region of said active layer in said essentially transparent focal conic texture while not changing said texture of an unreduced gap region of said active layer.

13. The writing device of claim 10 comprising three of said active layers which reflect red, green and blue light, respectively, each of said active layers being disposed between adjacent said electrically conductive layers.

14. The writing device of claim 10 comprising electronic circuitry for applying a voltage to said electrically conductive layers that enables at least one of erasing or writing of said active layer and wherein said writing device is adapted to be used with a back pattern that is removably disposed behind said semitransparent back layer, wherein said back pattern is visible through said semitransparent back layer.

15. The writing device of claim 10 comprising one of said electrically conductive layers forming rows of substantially parallel electrode lines on one side of said active layer and another of said electrically conductive layers forming columns of substantially parallel electrode lines on the other side of said active layer, wherein said columns are substantially orthogonal to said rows.

16. An article comprising the writing device of claim 10 selected from the group consisting of laptop, computer, computer monitor, computer mouse, computer keyboard, television, I-pod, MP3 player, PDA, video game controller, stereo, radio, CD player, appliance, toy, headphones, clock, handheld electronic devices, key ring accessory, shoe, purse, backpack, briefcase, computer case, computer covering, jewelry, watch, bottle, bottle lid, clothing, clothing embellishment, furniture, furniture embellishment, mobile entertainment case and combinations thereof.

17. A writing device comprising:
electrically conductive layers;
at least one active layer disposed in a gap between adjacent said electrically conductive layers, said active layer including bistable cholesteric liquid crystal material;
an outer layer of flexible transparent material forming a writing surface;
wherein said active layer is adapted to enable writing pressure applied to said writing surface to reduce thickness of said gap to form a reduced gap region in which the liquid crystal is light reflecting so as to reflect light of a color or is essentially transparent, a texture of said liquid crystal being unchanged in a non-reduced gap region; and
a semitransparent back layer that absorbs light that passes through said active layer, reflects grey light or light of a color and is light transmitting, wherein said semitransparent back layer comprises ink or a colored filter;
wherein said semitransparent back layer forms a bottom surface of said writing device, or a semitransparent or clear layer below said semitransparent back layer forms a bottom surface of said writing device;
wherein said writing device is adapted to be used with a back pattern that is removably disposed behind said semitransparent back layer, wherein said back pattern is visible through said semitransparent back layer.

18. The writing device of claim 17 wherein said back pattern comprises a waveguide including light sources disposed at an edge thereof, and light emitting portions on a surface of said waveguide enabling light to leave said waveguide in a pattern.

19. The writing device of claim 17 wherein said back pattern comprises an emissive, backlit or reflective display device for displaying images.

20. The writing device of claim 17 wherein said back pattern is removably held to said writing tablet.

21. The writing device of claim 17 wherein said semitransparent back layer includes one color, said active layer includes said cholesteric liquid crystal material that reflects light of another color and said back pattern includes yet another color.

22. The writing device of claim 17 wherein said back pattern is selected from the group consisting of: a template of a sports field, court or arena, a pattern for a children's game, an image for children to color, notepad lines, graph paper lines, and a menu of items that one can choose from.

23. A writing device comprising:
electrically conductive layers;
at least one active layer disposed in a gap between adjacent said electrically conductive layers, said active layer including bistable cholesteric liquid crystal material;
an outer layer of flexible transparent material forming a writing surface;
wherein said active layer is adapted to enable writing pressure applied to said writing surface to reduce thickness of said gap to form a reduced gap region in which the liquid crystal is light reflecting so as to reflect light of a color or is essentially transparent, a texture of said liquid crystal being unchanged in a non-reduced gap region; and
a semitransparent back layer that absorbs light that passes through said active layer, reflects grey light or light of a color and is light transmitting, wherein said semitransparent back layer comprises ink or a colored filter;
wherein said semitransparent back layer forms a bottom surface of said writing device, or a semitransparent or clear layer below said semitransparent back layer forms a bottom surface of said writing device;
wherein said writing device is adapted to be placed over a variety of articles for viewing through said semitransparent back layer, the articles being free of attachment to said writing device.

24. An electronic display comprising:
electrically conductive layers;
an active layer disposed between adjacent said electrically conductive layers, said active layer including cholesteric liquid crystal material;
a transparent front substrate disposed adjacent one of said electrically conductive layers near a front of said display;
a semitransparent back layer that absorbs light that passes through said active layer, reflects grey light or light of a color and is light transmitting, wherein said semitransparent back layer comprises a colored filter and a lower one of said electrically conductive layers is in contact with said colored filter;
wherein said semitransparent back layer forms a bottom surface of said display, or a semitransparent or clear layer below said semitransparent back layer forms a bottom surface of said display; and
electronic circuitry for applying a voltage to said electrically conductive layers that enables at least one of erasing or writing of said active layer.

25. An electronic display comprising:
electrically conductive layers;
an active layer disposed between adjacent said electrically conductive layers, said active layer including cholesteric liquid crystal material;
a front substrate disposed adjacent one of said electrically conductive layers near a front of said electronic display;
a semitransparent back layer that absorbs light that passes through said active layer, reflects grey light or light of a color and is light transmitting;
wherein said semitransparent back layer forms a bottom surface of said electronic display, or a semitransparent or clear layer below said semitransparent back layer forms a bottom surface of said electronic display; and
electronic circuitry for applying a voltage to said electrically conductive layers that enables at least one of erasing or writing of said active layer,
wherein writing formed on said cholesteric liquid crystal material contrasts with said semitransparent back layer and said semitransparent back layer is see through.

26. The electronic display of claim 25 wherein said front substrate is transparent and flexible and said active layer includes a dispersion of said cholesteric liquid crystal material and polymer, wherein pressure applied to said front substrate changes a reflectance of said cholesteric liquid crystal material to form the writing.

27. The electronic display of claim 25 wherein said semitransparent back layer includes a colored polymeric layer or a polymeric layer including a colored coating on a surface of said polymeric layer.

28. The electronic display of claim 25 wherein said semitransparent back layer includes a colored filter.

* * * * *